United States Patent [19]

Berlivet et al.

[11] 4,348,857
[45] Sep. 14, 1982

[54] ROTARY MOWER CONDITIONER

[75] Inventors: Marc A. Berlivet; Abel A. J. Guerineau, both of Coex, France

[73] Assignee: Hesston Corporation, Hesston, Kans.

[21] Appl. No.: 248,859

[22] Filed: Mar. 30, 1981

Related U.S. Application Data

[62] Division of Ser. No. 94,883, Nov. 16, 1979, abandoned.

[30] Foreign Application Priority Data

Mar. 27, 1979 [FR] France .................. 79 07657

[51] Int. Cl.³ .................. A01D 57/26; A01D 57/30
[52] U.S. Cl. .................. 56/192; 56/13.6
[58] Field of Search .................. 56/6, 13.6, 192, 320.1

[56] References Cited

U.S. PATENT DOCUMENTS

| 1,656,105 | 1/1928 | Durkee | 56/13.6 |
|---|---|---|---|
| 3,501,901 | 3/1970 | van der Lely | 56/13.6 |
| 3,608,290 | 9/1971 | Robinson | 56/192 |
| 3,676,988 | 7/1972 | Hauser-Lienhard | 56/192 |
| 3,716,973 | 2/1973 | Kidd | 56/192 |
| 3,751,889 | 8/1973 | Overesch | 56/13.6 |
| 3,754,384 | 8/1973 | Case et al. | 56/192 |
| 4,177,625 | 12/1979 | Knight et al. | 56/13.6 |
| 4,178,746 | 12/1979 | Allely | 56/192 |
| 4,188,773 | 2/1980 | Kaetzel | 56/6 |
| 4,244,163 | 1/1981 | Gantzer et al. | 56/192 |

FOREIGN PATENT DOCUMENTS

| 2757211 | 6/1978 | Fed. Rep. of Germany | 56/13.6 |
|---|---|---|---|
| 1946321 | 4/1980 | Fed. Rep. of Germany | 56/13.6 |
| 2222603 | 10/1974 | France | 56/13.6 |

*Primary Examiner*—Paul J. Kirsch
*Attorney, Agent, or Firm*—Schmidt, Johnson, Hovey & Williams

[57] ABSTRACT

A pair of generally flat, horizontally disposed mowing rotors at the front of the machine sever the standing crops as the machine is advanced and, by creation of an air stream as well as through a physical throwing force, the rotors propel the severed crops rearwardly through a centrally disposed passage to a conditioning zone adjacent the rear of the machine where such severed crops are treated by the conditioner to expedite curing of the crops when they are thereafter directed onto the ground in a swath or windrow. Each of the rotors is comprised of a series of radially outwardly projecting, discrete and circumferentially spaced apart fins that support cutting blades at their outermost tips, and to protect the fins against structural damage caused by accidental impact with stumps and other obstacles in the field, each rotor is provided with a generally circular shield that underlies the rotor and is slightly larger in diameter than the corresponding rotor, the blades, however, projecting outwardly beyond the peripheral edges of the shields. Ground skids located beneath the shields support the rotors during operation and may be vertically adjusted such as to regulate the cutting height of the rotors.

4 Claims, 6 Drawing Figures

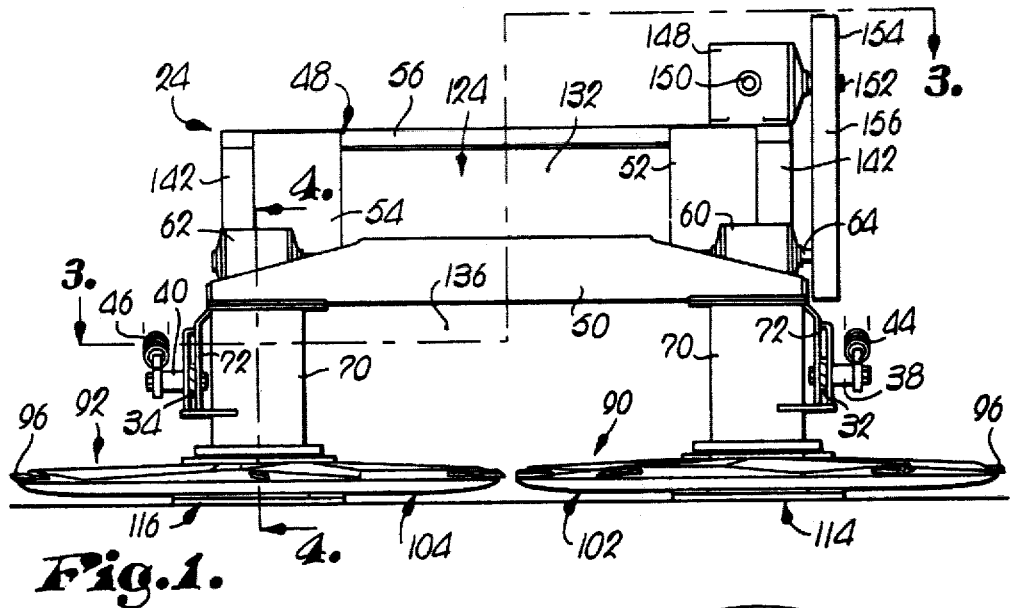
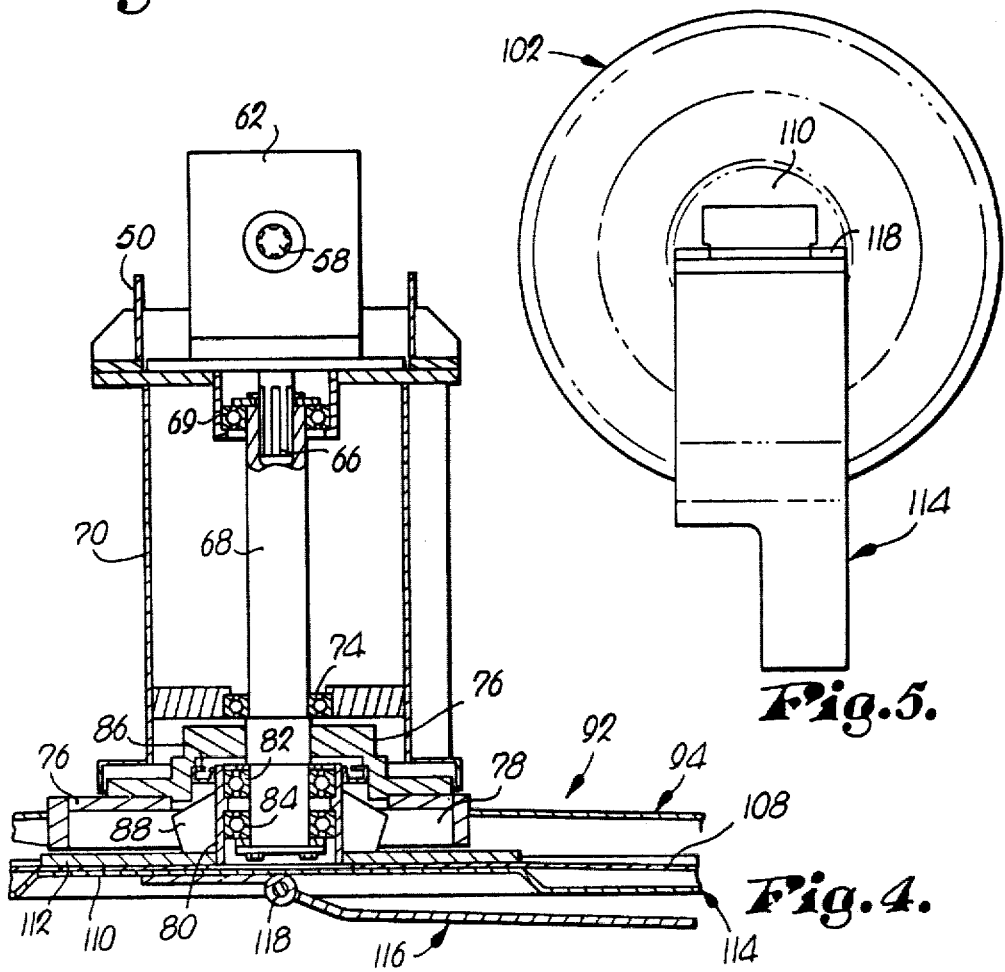

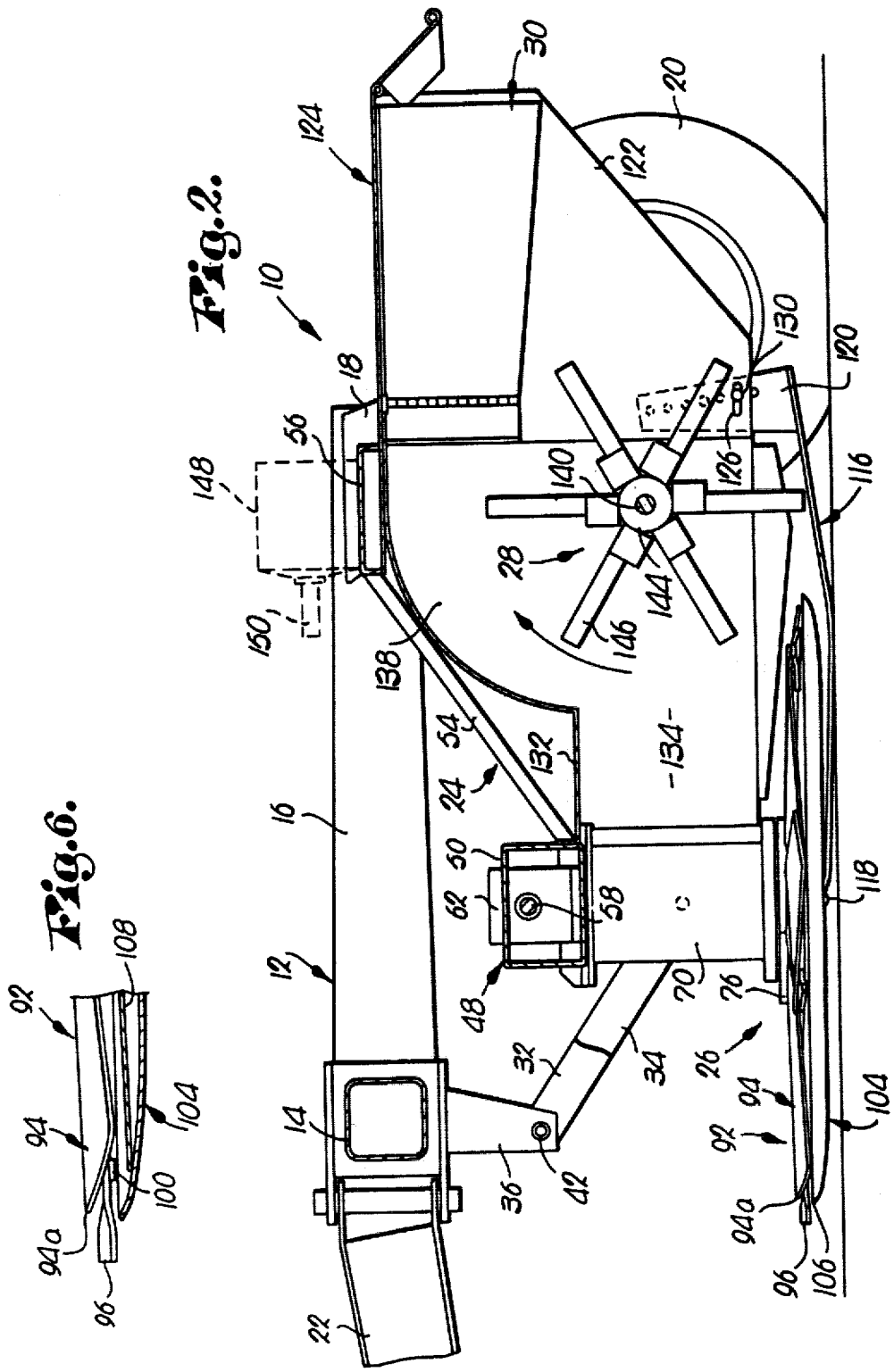

ROTARY MOWER CONDITIONER

This is a division of application Ser. No. 06/094,883 filed on Nov. 16, 1979, now abandoned.

TECHNICAL FIELD

This invention relates to the hay handling arts and, more particularly, to so-called "mower-conditioners" that are capable of mowing, conditioning and windrowing the crop all in one operation.

BACKGROUND ART

There are certain advantages to be gained by employing rotary cutters to accomplish the mowing function as opposed to employing reciprocating sickles, for example. There are, however, certain disadvantages as well, among these being the vulnerability of the mowing rotors to damage due to impacts with obstacles such as stumps, dirt mounds, and stones. Furthermore, in the formation of windrows using rotary mowers, it has heretofore been thought necessary to utilize a pair of cooperating, upright drums counterrotating in such a way that the mowed crops are engaged by the drums and flung rearwardly in a converged path of travel for subsequent deposit on the ground in a windrow.

SUMMARY OF THE PRESENT INVENTION

One object of the present invention is to incorporate the rotary mowing concept into a mower-conditioner in such a way that the inherent advantages of rotary mowing are obtained while the disadvantages thereof as above mentioned and otherwise are avoided. To this end, then, each of the mowing rotors is generally flat in overall configuration and is provided with a series of discrete, radially outwardly projecting fins that move in a horizontal plane during rotation yet are capable of propelling the mowed crop rearwardly in a central, common stream to a suitable conditioner where the crops are treated in a manner that promotes rapid curing upon deposit of the crops into a windrow or swath on the ground. By virtue of the fin-like construction of the rotors and their slightly pitched or banked leading surface, a more than adequate assisting airstream is created that, combined with the physical thrusting abilities of the fins, eliminates the need for upright, counterrotating drums typical of several machines currently in use.

Circular shields are provided beneath the rotors, and the peripheral edges of such shields are located slightly outwardly beyond the tips of the fins so that the fins are protected against damaging impacts with solid obstacles, the relatively short cutting blades on the outermost tips of the fins projecting outwardly beyond the shields to perform the actual mowing. Any trash, dirt and the like tending to collect on top of the shields during operation can readily escape as a result of the spacing between the individual fins of each rotor, and ground-engaging skids mounted below the two shields for supporting the weight of the rotors during operation may be height-adjusted so as to accordingly regulate the mowing height of the machine.

BRIEF DESCRIPTION OF THE DRAWINGS

FIG. 1 is a front elevational view of a rotary mowing unit constructed in accordance with the principles of the present invention, such unit being shown in isolated form separate from its supporting framework;

FIG. 2 is a longitudinal, vertical cross-sectional view through the machine showing the way in which the mowing unit is supported by the carrying framework therefor;

FIG. 4 is an enlarged, vertical cross-sectional view of one of the mowing rotors and its associated mechanisms, such view being taken along line 4—4 of FIG. 1 and showing such rotor and mechanism on a fragmentary basis;

FIG. 5 is a bottom plan view of one of the rotor shields and its associated ground skid; and FIG. 6 is an enlarged, fragmentary, cross-sectional view of one of the rotors illustrating the way in which the knife blades are attached to the tips of the rotor fins.

DETAILED DESCRIPTION

Figure 3:
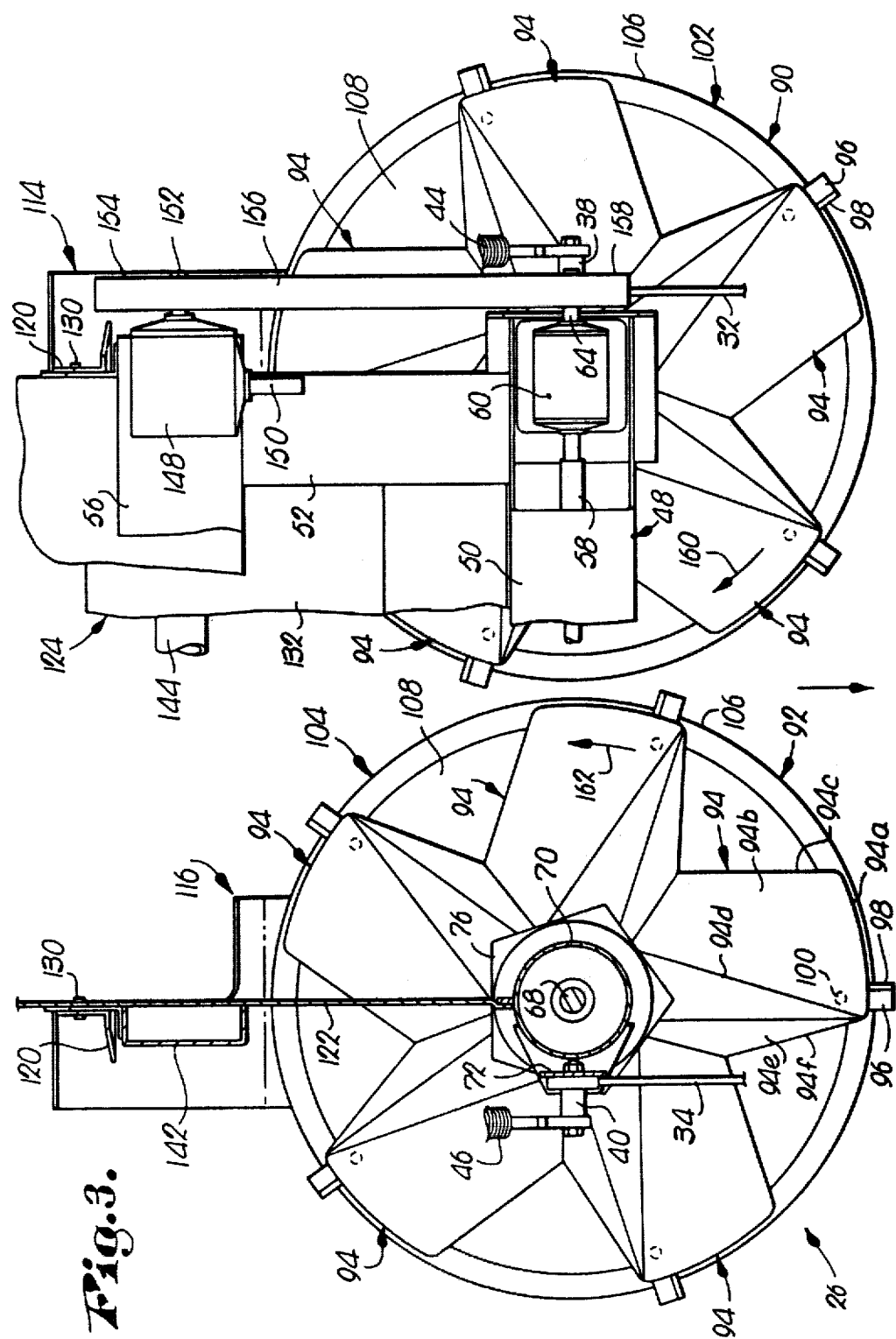
FIG. 3 is an enlarged view of the mowing unit taken substantially along line 3—3 of FIG. 1 with parts broken away and shown in cross section and elevation for clarity.

The machine 10 includes a supporting frame 12 (FIG. 2) that is only fragmentarily shown in the drawings but is to be understood as being generally U-shaped in top plan, including a front, horizontally extending beam 14 that is transverse to the normal path of travel of the machine 10, a pair of beams 16 (only one being shown) extending rearwardly from the beam 14 at opposite ends thereof, and a depending and diagonally rearwardly extending strut 18 at the rear end of each of the beams 16 respectively. Each of the struts 18 has a ground wheel 20 at the lower end thereof for supporting the frame 12 for over-the-ground travel, and a towing tongue 22 extends forwardly from the frame 12 to adapt the latter for connection to a towing vehicle (not shown) to provide motive power for advancing the machine 10 across the field.

A mowing, conditioning and windrowing unit 24 is disposed within the bight of the U-shaped frame 12 generally below the latter and includes mowing mechanism broadly denoted by the numeral 26, a conditioner broadly denoted by the numeral 28 and located rearwardly from the mowing mechanism 26, and means for forming the mowed and conditioned crop into a windrow or swath for redeposit onto the ground, such means including, for example, various types of baffle or deflector-like structure 30 located rearwardly from the conditioner 28. A pair of support arms 32 and 34 pivotally depend from respective lugs 36 (only one being shown) at opposite ends of the cross beam 14 and are pivotally secured at their lowermost and rearmost ends to trunnions 38 and 40 (FIGS. 1 and 3) projecting laterally outwardly from opposite sides of the unit 24. The trunnions 38 and 40 are coaxially aligned, and the parallel arms 32,34 thus permit the unit 24 to swing up and down about a transverse axis 42 at the lower ends of the lugs 36. The trunnions 38 and 40 permit the unit 24 to also pivot about their common axis such that the unit 24 may remain substantially level in all positions of its up-and-down swinging movement about the axis 42. A hydraulic cylinder or the like may be suitably connected between the frame 12 on the one hand and the unit 24 on the other hand so as to raise and lower the latter between working and transport positions, and a pair of flotation springs 44,46 may be attached to the trunnions 38,40 on the one hand and the frame 12 on the other hand so as to floatingly support the unit 24 when the latter is lowered to its working position, such springs 44,46 thus bearing a part of the weight of the unit 24 otherwise borne totally by ground-engaging skids yet to be described.

The unit 24 includes a subframe broadly denoted by the numeral 48 and including a front, transverse, horizontally extending member 50, a pair of upwardly and rearwardly extending side members 52 and 54, and a rearwardly disposed, horizontally extending, transverse cross member 56 interconnecting the side members 52,54 at the upper rear ends thereof. Directly and indirectly, the mowing mechanism 26, the conditioner 28 and the baffle structure 30 are all supported by the subframe 48.

With respect to the mowing mechanism 26, the latter includes a horizontally extending shaft 58 extending within and for substantially the entire length of the tubular front member 50, opposite ends of the shaft 58 being drivingly connected to a pair of right angle gearboxes 60 and 62, the gearbox 60 having a power input shaft 64. Thus, power supplied to the gearbox 60 via its input shaft 64 is likewise transmitted to the gearbox 62 via shaft 58.

As illustrated in FIG. 4, each of the gearboxes 60,62 has a depending output shaft 66 that is splined to fixedly receive the mating upper end of an upright drive shaft 68 supported for rotation at its upper end by bearings 69. An upright, cylindrical housing 70 concentrically receives the shaft 68 and is affixed at its upper end to the member 50 for structural support. Additionally, structural support may be provided by a depending bracket 72 along the outboard side of the housing 70 as illustrated in FIGS. 1 and 3, such bracket 72 being fixed at its upper end to the member 50 and at its lower end to the housing 70. As a matter of convenience, the bracket 72 may also be utilized as the means by which the trunnions 38,40 are secured to the unit 24.

Each of the housings 70 is provided with a lower bearing 74 therein as illustrated in FIG. 4, said lower bearing 74 cooperating with the upper bearing 69 to maintain the shaft 68 centered within the housing 70 during operation. A generally concavo-convex hub 76 having a stepped convex surface is secured to the shaft 68 for rotation with the latter below the bearing 74. The hub 76 opens downwardly such that its concavity 78 provides room for and receives a bearing box 80 that houses bearings 82 and 84 receiving the lowermost end of the shaft 68. Bearing box 80 is intended to be stationary during rotation of the shaft 68 with its hub 76, and a sealing ring 86 carried internally by the hub 76 within the concavity 78 wipingly engages the bearing box 80 during rotation of the hub 76 and helps guard against the ingress of foreign particles to the bearings 82,84. Generally radially projecting, trash-clearing structures 88 on the bearing box 80 discourage the ingress of trash material deeply into the concavity 78.

The hubs 76 of the shaft 68 are generally polygonal in plan as illustrated for example in FIG. 3 and serve as the means by which the mowing rotors 90 and 92 of mowing mechanism 26 are attached to their respective shafts 68 for receiving driving power. Each of the rotors 90,92 is generally flat and lies substantially within a horizontal plane for rotation about the axis of the corresponding shaft 68 during operation. Furthermore, each of the rotors 90,92 is provided with five discrete and generally radially outwardly extending fins 94 that are spaced apart circumferentially from one another at their radially outermost tips 94a, the fins 94 merging together at a point somewhat radially adjacent the hub 76. Although each of the fins 94 is generally flat, by the same token each is also formed in such a way as to have a pitched, broad, normally leading surface 94b that slopes upwardly and in a trailing direction away from the leading edge 94c of the fin 94, such surface 94b thus serving as a means for inducing an air flow when the rotors 90,92 are driven in directions with the edges 94c of the fins 94 leading. Each of the surfaces 94b has its trailing termination defined by a diagonally extending line 94d at which location a surface 94e slopes downwardly in a trailing direction from the line 94d until intersecting the next adjacent fin 94 or the trailing edge 94f.

Each of the fins 94 is also provided with cutting means, such cutting means taking the form of a relatively short blade 96 that extends radially outwardly from the corresponding fin 94 and is provided with a cutting edge 98. The blade 96 of each fin 94 is secured to the latter via a pivot 100 located on the underside of the fin 94, such pivot 100 enabling the blade 96 to swing rearwardly in a retrograde movement in the event that solid objects are encountered during high speed rotation. As is apparent, centrifugal force maintains the blade 96 extending radially outwardly during operation. It should be further pointed out at this juncture that the two rotors 90 and 92 are driven in opposite rotative directions during operation as illustrated in FIG. 3 such that the fins 94 sweep generally inwardly along the mowing front of the mechanism 26 and thence rearwardly along the fore-and-aft axis of the machine 10. It will be noted viewing FIG. 3 also that the path of circular travel of the blades 96 on rotor 92 overlaps the corresponding path of travel of the blades 94 of rotor 90 at a location intersected by an imaginary line drawn between the two axes of rotation of the rotors 90,92. The timing of rotors 90,92 is such, however, that there is no interference between the blades 96 of the two rotors in the area of overlap.

The rotors 90 and 92 are also provided with respective circular shields 102 and 104 that underlie the same and serve to prevent damaging impacts to the fins 94 from stumps, dirt mounds and other obstacles encountered during field operation. Each of the shields 102,104 is circular in plan and has an outermost peripheral edge 106 located radially outwardly of the tips 94a of the fins 94 of the corresponding rotor 90 or 92. In other words, each of the shields 102 is slightly larger in diameter that its corresponding rotor 90 or 92, yet the blades 96 project outwardly beyond such edges 106 when the rotors 90,92 are placed in operation.

Each of the shields 102,104 is slightly concavo-convex with its concave side facing upwardly. A circular plate 108 only slightly smaller in diameter than the shields 102,104 is fitted within the concave side of each shield 102,104 respectively so as to reduce the tendency of the shields 102,104 to collect trash, dirt, etc. during operation. The opposite, convex and bottom side of each of the shields 102,104 is generally flat throughout its major expanse, although the marginal periphery of such bottom side is upturned slightly.

As seen with particular clarity in FIG. 4, each of the shields 102,104 is provided with a central portion 110 that is inset with respect to the bottom side of each shield 102,104 while being in relief with respect to the top side thereof. The relieved nature of the top side of each central portion 110 provides a basis for securing the shields 102,104 and their plates 108 to an overlying mounting plate 112 that in turn is rigidly affixed to the corresponding bearing box 80. By this means, the shields 102 and 104 are designed against rotation with their corresponding drive shafts 68 and rotors 90,92.

As also particularly well shown in FIG. 4 and in FIG. 5, the depressed or inset nature of the central portion 110 with respect to the bottom side of the shields 102,104 provides a convenient attaching point for ground skids 114 and 116 to the shields 102,104. In this respect, each of the fore-and-aft extending skids 114,116 is provided at its forwardmost end with a pivotal connection 118 to the corresponding shield 102 or 104 within the portion 110 thereof. Each of the skids 114,116 extends rearwardly from its pivotal connection 118 to a point just rearwardly of the conditioner 28, at which location a generally upwardly extending strap 120 is provided for securing such rear end of the skid 114 or 116 to the proximal sidewall 122 of a housing 124 yet-to-be described in detail. An aperture 126 in the sidewall 122 may be aligned with any selected one of a vertical series of holes 128 in each of the straps 120, and upon such aligned registration, a suitable fastener 130 may be inserted so as to releasably hold the strap 120 in a corresponding position of vertical adjustment. Such vertical positioning of the straps 120 has the effect also of determining the vertical positioning of the skids 114,116 about their respective horizontal pivots 118, this in turn determining the mowing height of the mowing mechanism 26.

As above mentioned, the unit 24 also includes a housing 124 leading rearwardly from the mowing mechanism 126 and terminating rearwardly adjacent the window forming structure 30. The housing 124 is provided with a top wall 132 extending between the two subframe members 52,54 and leading rearwardly from front subframe member 50 in an initially generally horizontal attitude, the top wall 132 thereafter arching upwardly and rearwardly to pass beneath the rear subframe member 56 and on to the back of the machine 10. Sidewalls 122 lead rearwardly from respective ones of the upright housings 70 as illustrated in FIG. 3 and intersect with the top wall 132 all along the lateral extremities thereof.

The housing 124 is open along the bottom thereof and defines a passage denoted generally by the numeral 134 having an entry end 136 defined by the spaced apart housings 70 associated with the rotors 90,92. The passage 134 is provided with a zone 138 beneath the upwardly arched portion of the top wall 132 that serves as a crop conditioning zone and within which the conditioner 28 is located.

The conditioner 28 has been illustrated herein as taking the form of a single rotary device as opposed, for example, to a pair of cooperating rolls having a pressure nip therebetween through which the crops are passed so as to crack their stems and promote curing. By and large, the illustration of conditioner 28 as such a rotary device is by way of example only, although it will be understood that this type of device is preferred.

With this in mind, then, the conditioner 28 may be further described as including a transversely extending shaft 140 that spans the sidewalls 122 of housing 124 and is rotatably supported by bearing means not illustrated but which are to be understood as being located within the sidewalls 122 or within rigidifying structure such as the upright rigidifying channel 142 illustrated in FIG. 3. The conditioner 28 further includes a hub 144 extending along the length of the shaft 140, said hub 144 having a series of radially outwardly projecting elements 146 attached thereto along the length thereof for passing through a stream of crop materials when the conditioner 28 is rotated such as to abrade the stems of such materials and thereby effectively promote rapid curing thereof when the materials are thereafter deposited on the ground.

The conditioner 28 is normally rotated in a clockwise direction as viewed in FIG. 2 such that the elements 146 sweep upwardly and rearwardly at the front extent of the conditioner 28, and the location of the shaft 140 is coordinated with the length of the elements 146 in such a manner that the tips of the latter extend downwardly to the level of the rotors 90,92 on the down sweep of such elements 146.

Driving power for the rotors 90,92 and the conditioner 28 is received by a right angle gearbox 148 situated on the right end of the rear subframe member 56 as viewed in FIGS. 1 and 3. An input shaft 150 of the gearbox 148 extends forwardly from the latter and may be connected by suitable U-joint structure (not shown) to a mechanical drive line carried along the tongue 22 and ultimately adapted at its forwardmost end for connection to the power takeoff shaft of a suitable towing vehicle. An output shaft 152 of the gearbox 148 projects laterally outwardly from the latter at right angles to the input shaft 150 and carries a drive pulley 154 about which a belt 156 may be trained. The belt 156 in turn is trained about a pulley 158 on the power input shaft 64 of the gearbox 60 so as to supply driving power to the shafts 68 of rotors 90,92. Similarly, although not illustrated, it is to be understood that the belt 156 may also be wrapped around a suitable driven pulley connected or otherwise associated with the shaft 140 of conditioner 28 so as to drive the latter.

OPERATION

As the machine 10 is advanced across a field, the unit 24 rides on the ground skids 114,116, the weight on the skids 114,116 being determined by the extent to which the flotation springs 44,46 are utilized to carry part of the weight of the unit 24. The rotors 90,92 spin in opposite rotative directions as illustrated by the arrows 160 and 162 respectively in FIG. 3, and the mowing height of the rotors 90,92 is determined by the selected position for the straps 120 as illustrated in FIG. 2.

As the rotors 90,92 encounter standing crops, the blades 96 sever such standing crops and the fins 94 sweep the severed crops inwardly around the upright, stationary housings 70 and into a common stream that enters the entry end 136 of the passage 134. The rotors 90,92 are spinning so rapidly that the fins 94 physically propel the severed crops rearwardly into the passage 134, but additionally, the banked surfaces 94b of the fins 94 create an air stream that moves rearwardly with considerable velocity and entrains the severed crop materials such as to carry the same rearwardly through passage 134 to the conditioning zone 138. At that location the upwardly sweeping elements 146 of the conditioner 28 pass through the flow of crop materials and abrade the stems of the latter in a conditioning action that promotes rapid curing. Such rotation of the conditioner 28 also encourages the continued flow of the crop materials such that they are propelled rearwardly from the conditioner 28 to the rear of the machine 10 where they are acted upon by the baffle structure 30 so as to be directed down to the ground. Depending upon the arrangement of the baffle structure 30, the crop material may be converged rearwardly such as to form a windrow as the material deposits onto the ground or may be left unconverged so as to form a relatively wide swath as may be desired.

In the event that any solid obstacles, such as stumps, dirt mounds, rocks and the like, are encountered by the machine 10 during its advancement, the blades 96 may swing rearwardly about their pivots 100 to the extent necessary to avoid breakage. Additionally, impacts of this sort will be absorbed by the shields 102 and 104 instead of by the fins 94 of the rotors 90,92 so as to avoid damage to the fins 94. Changes in ground contour are detected initially by the skids 114,116 such that the unit 24 may swing upwardly or downwardly about the front axis 42 as may be necessary.

In the event that trash material, such as weeds, dirt and the like, may tend to accumulate within the shields 102,104, the rapidly moving fins 94 tend to dislodge and remove such accumulating material before the same can actually accumulate to any significant degree.

The machine as above described accomplishes the desired rotary mowing, conditioning and windrowing functions without the need for upright rotating conveying drums which have heretofore been thought necessary to proper performance. It has been found that the high-speed rotation of the flat rotors 90,92 coupled with the slight banking of the leading surfaces 94b of their fins 94, provides more than ample air flow to assist in conveying the severed crops rearwardly to the conditioner 28. Furthermore, such additional air flow, in conjunction with the action of the individual elements 146 of conditioner 28, is conducive to the formation of a light, high and fluffy windrow that promotes rapid curing and consequently upgrades the entire harvesting operation.

We claim:

1. In a mobile crop-harvesting machine:
    front frame structure including a front, transverse beam and at least a pair of upright, stationary housings depending from said front beam at spaced locations along the latter;
    an upright, rotatable drive shaft contained within each of said housings, respectively;
    a mowing rotor attached to the lower end of each of said shafts, respectively and projecting radially outwardly from below the lower termination of the corresponding housing;
    means coupled with said shafts for effecting said rotation to drive said rotors in a direction to sever standing crop and throw it rearwardly between said housings;
    rear frame structure spaced rearwardly from said front frame structure including upright portions on opposite sides of the path of travel of severed crop from said rotors; and
    fore-and-aft, interconnecting frame structure extending between said front frame structure and said rear frame structure,
    said interconnecting frame structure including a pair of side members affixed to respective ones of said housings at least adjacent said lower terminations thereof above said rotors and extending rearwardly therefrom along opposite sides of said path of travel of the severed crop to said upright portions,
    each of said side members comprising a panel connected to and extending along substantially the full upright length of its corresponding housing at the front end of the panel and connected to and extending along substantially the full upright length of its corresponding upright portion at the rear end of the panel.

2. In a mobile crop-harvesting machine as claimed in claim 1, wherein said panels comprise part of a housing means for containing the severed crop projected rearwardly by said rotors.

3. In a mobile crop-harvesting machine as claimed in claim 1; and ground-engaging skid means located beneath said rotors and carried by said frame structures.

4. In a mobile crop-harvesting machine as claimed in claim 1; and a crop conditioner spaced rearwardly from said rotors in disposition for receiving the severed crops from said rotors and physically engaging such crops in a manner to promote curing thereof.

* * * * *